US011655617B2

(12) United States Patent
Harnetiaux

(10) Patent No.: US 11,655,617 B2
(45) Date of Patent: May 23, 2023

(54) SYSTEM AND METHOD FOR MONITORING THE WEAR ON A ROTATING GROUND ENGAGING TOOL OF AN AGRICULTURAL IMPLEMENT

(71) Applicant: CNH Industrial America LLC, New Holland, PA (US)

(72) Inventor: Travis Lester Harnetiaux, Clarksville, TN (US)

(73) Assignee: CNH Industrial America LLC, New Holland, PA (US)

( * ) Notice: Subject to any disclaimer, the term of this patent is extended or adjusted under 35 U.S.C. 154(b) by 1030 days.

(21) Appl. No.: 16/395,892

(22) Filed: Apr. 26, 2019

(65) Prior Publication Data

US 2020/0340215 A1   Oct. 29, 2020

(51) Int. Cl.
*E02F 9/26* (2006.01)
*A01C 7/20* (2006.01)
*A01C 7/16* (2006.01)
*A01B 33/08* (2006.01)

(52) U.S. Cl.
CPC ............ *E02F 9/267* (2013.01); *A01B 33/087* (2013.01); *A01C 7/16* (2013.01); *A01C 7/203* (2013.01); *E02F 9/264* (2013.01)

(58) Field of Classification Search
CPC ...... A01C 7/203; A01D 43/085; G01N 3/405; G01N 27/04; E02F 9/267; A01B 23/02; A01B 63/111; A01B 79/005; G07C 5/0825; B60R 16/02; H04L 12/24; H04L 41/24
See application file for complete search history.

(56) References Cited

U.S. PATENT DOCUMENTS

| | | | |
|---|---|---|---|
| 5,361,308 A | 11/1994 | Lee et al. | |
| 7,930,844 B2 | 4/2011 | Quarfordt et al. | |
| 8,371,240 B2 | 2/2013 | Wollenhaupt | |
| 8,411,930 B2 | 4/2013 | Ridley et al. | |
| 8,738,243 B2 | 5/2014 | Sauder | |
| 9,116,134 B2 | 8/2015 | Satou et al. | |
| 9,288,941 B2 * | 3/2016 | Pollklas | A01D 43/085 |
| 9,670,649 B2 | 6/2017 | Bewley et al. | |
| 9,699,947 B2 | 7/2017 | Wendte et al. | |
| 9,714,923 B2 | 7/2017 | Behmlander et al. | |
| 9,880,075 B2 | 1/2018 | Finch et al. | |
| 9,930,826 B2 | 4/2018 | McCloskey et al. | |

(Continued)

FOREIGN PATENT DOCUMENTS

| | | | | |
|---|---|---|---|---|
| DE | 202013102917 U1 * | 9/2013 | ............. | H04L 41/24 |
| DE | 102017211329 A1 * | 1/2019 | ........... | A01B 63/111 |

(Continued)

*Primary Examiner* — Yuri Kan, P.E.
(74) *Attorney, Agent, or Firm* — Rebecca Henkel; Rickard DeMille

(57) ABSTRACT

A system for monitoring wear on ground engaging tools of an agricultural implement includes a ground engaging tool supported relative to a frame of the agricultural implement, the ground engaging tool configured to rotate with engagement of the ground during operation of the agricultural implement, a non-contact sensor configured to detect a parameter indicative of wear on the ground engaging tool, and a controller communicatively coupled to the non-contact sensor. The controller is configured to determine a status of the wear on the ground engaging tool based on sensor data received from the non-contact sensor.

19 Claims, 5 Drawing Sheets

(56) References Cited

U.S. PATENT DOCUMENTS

| | | | |
|---|---|---|---|
| 2011/0298889 A1 | 12/2011 | Seto | |
| 2018/0165884 A1 | 6/2018 | Wagner et al. | |
| 2020/0114843 A1* | 4/2020 | Foster | G07C 5/0825 |
| 2020/0305336 A1* | 10/2020 | Harmon | A01B 23/02 |
| 2020/0308810 A1* | 10/2020 | Harmon | E02F 9/267 |
| 2020/0340215 A1* | 10/2020 | Harnetiaux | A01C 7/203 |
| 2022/0163436 A1* | 5/2022 | López-Cuervo | G01N 3/405 |

FOREIGN PATENT DOCUMENTS

| | | | | |
|---|---|---|---|---|
| DE | 102017127648 B3 * | 4/2019 | | A01B 23/02 |
| JP | 2003307095 | 10/2003 | | |
| WO | WO1993023820 | 11/1993 | | |

* cited by examiner

250 →

252 — RECEIVING AN INPUT INDICATIVE OF THE WEAR ON THE GROUND ENGAGING TOOL FROM A NON-CONTACT SENSOR SUPPORTED RELATIVE TO THE FRAME

254 — COMPARING THE INPUT WITH A PREDETERMINED WEAR THRESHOLD FOR THE GROUND ENGAGING TOOL

256 — DETERMINING A STATUS OF THE WEAR ON THE GROUND ENGAGING TOOL BASED ON THE COMPARISON OF THE INPUT WITH THE PREDETERMINED WEAR THRESHOLD

FIG. 5

SYSTEM AND METHOD FOR MONITORING THE WEAR ON A ROTATING GROUND ENGAGING TOOL OF AN AGRICULTURAL IMPLEMENT

FIELD OF THE INVENTION

The present subject matter relates generally to agricultural implements and, more particularly, to a system for monitoring the status of wear on rotating ground engaging tools of an agricultural implement and related methods.

BACKGROUND OF THE INVENTION

Generally, agricultural seed planting units are towed behind a tractor or other work vehicle via a mounting bracket secured to a rigid frame of an agricultural implement, such as a planter or seeder. A seed-planting implement typically includes one or more rotating ground engaging tools configured to rotate or roll relative to the soil as the implement is moved across a field. For example, in certain configurations, the implement may include one or more disc openers that form a furrow or trench within the soil while rotating relative to the soil. Furthermore, the implement may also include one or more closing disc(s) that close the furrow while rotating relative to the soil.

Typically, the ground engaging tools(s) are configured to work the soil in a specific way. For example, the disc opener(s) are configured to create a trench having a specific shape and depth, which assists in increasing crop yield. For instance, the disc openers may be adjusted to create a v-shaped trench at a specific depth corresponding to a seed type. Similarly, the depth of the closing discs may be adjusted to close the trench and create a mound of soil of a particular height. As the disc openers and closing discs wear, however, the engagement between the discs and the soil changes, which negatively impacts the planting operation. Unfortunately, monitoring the wear on the disc openers and closing discs is time consuming and relies heavily on the operator to determine when it is time to replace each of the disc openers and closing discs. Further, it may be difficult to determine when a disc opener or closing disc becomes damaged, which may affect the quality of the disc opener or closing disc performance.

Accordingly, an improved system and method for monitoring the wear on rotating ground engaging tools of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural implement. The agricultural implement generally includes a toolbar and a plurality of row units configured to be supported by the toolbar. Each row unit of the plurality of row units has a frame, a disc opener rotatably supported relative to the frame, a sensor supported relative to the disc opener, and a gauge wheel rotatably coupled to the frame and actuatable to adjust a penetration depth of the disc opener. The sensor is configured to detect a parameter indicative of wear on the disc opener. Additionally, the agricultural implement includes a controller communicatively coupled to the sensor of one or more of the plurality of row units, with the controller being configured to determine a status of the wear on the associated disc opener of the one or more of the plurality of row units based on sensor data received from the sensor.

In another aspect, the present subject matter is directed to a wear monitoring system for ground engaging tools of an agricultural implement. The wear monitoring system includes a ground engaging tool supported relative to a frame of the agricultural implement, with the ground engaging tool being configured to rotate with engagement of the ground during operation of the agricultural implement. The wear monitoring system also includes a non-contact sensor configured to detect a parameter indicative of wear on the ground engaging tool. Additionally, the wear monitoring system includes a controller communicatively coupled to the non-contact sensor, with the controller being configured to determine a status of the wear on the ground engaging tool based on sensor data received from the non-contact sensor.

In a further, embodiment, the present subject matter is directed to a method for monitoring wear on a ground engaging tool of an agricultural implement. The agricultural implement generally includes a frame and a ground engaging tool supported relative to the frame such that the ground engaging tool rotates with engagement of the ground during operation of the agricultural implement. The method includes receiving, with a computing device, an input indicative of the wear on the ground engaging tool from a non-contact sensor supported relative to the frame. The method further includes comparing, with the computing device, the input with a predetermined wear threshold for the ground engaging tool. Additionally, the method includes determining, with the computing device, a status of the wear on the ground engaging tool based on the comparison of the input with the predetermined wear threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a flow diagram of one embodiment of a method for monitoring the wear on ground engaging tools of an agricultural implement in accordance with aspects of the present subject matter.

DETAILED DESCRIPTION OF THE INVENTION

Figure 1:
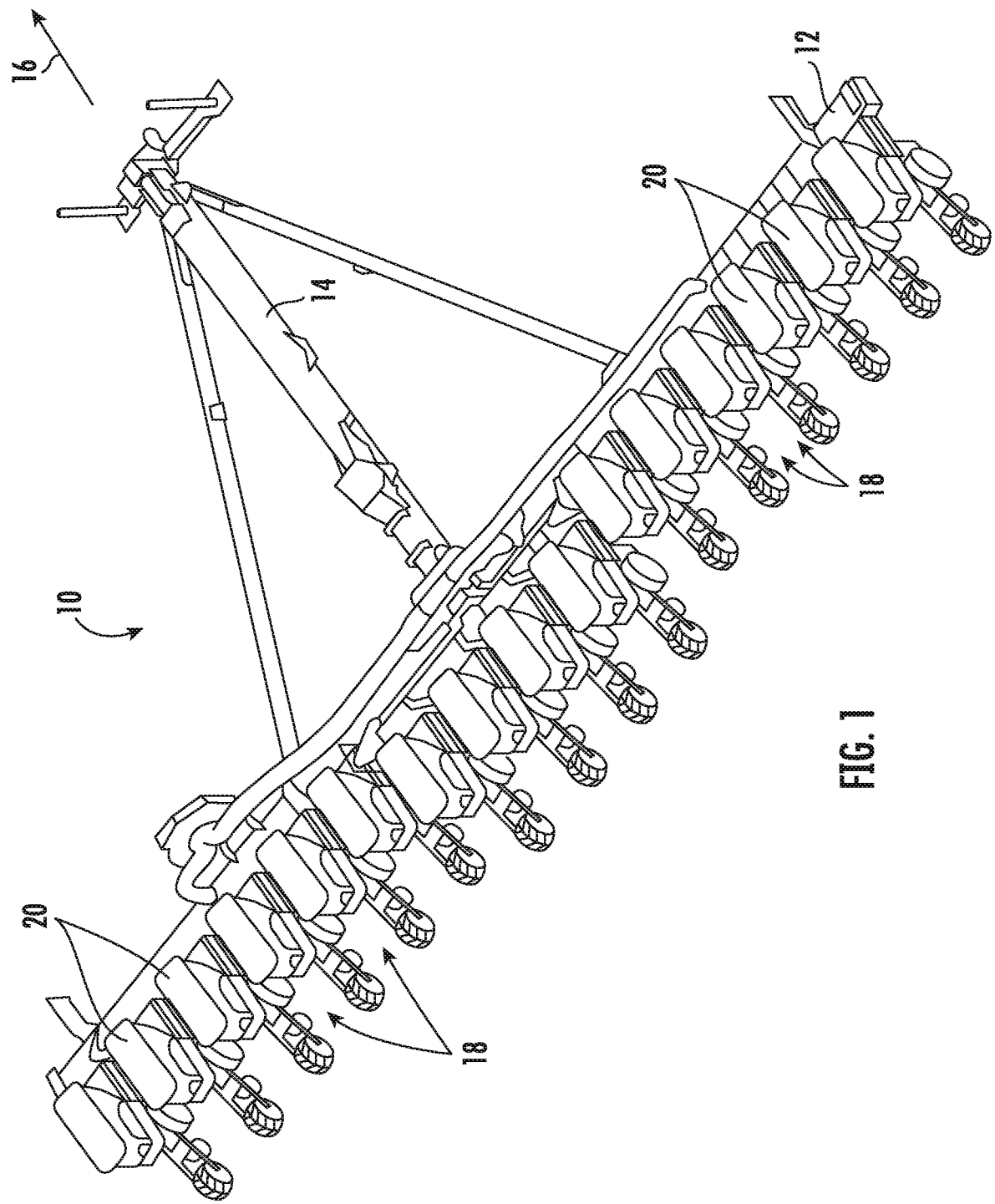
FIG. 1 illustrates a perspective view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the wear on rotating ground engaging tools of an agricultural implement. Specifically, in several embodiments, a controller of the disclosed system may be configured to monitor the diameter of one or more rotating ground engaging tools of the implement, such as one or more disc openers, closing discs, and/or the like, relative to a baseline or threshold diameter associated with the tool(s). In such embodiment, the agricultural implement may include one or more sensors for detecting the wear on the rotating ground engaging tool(s). The controller may be configured to monitor an input from the associated sensor(s) to determine the amount of wear occurring on the tool(s). In response to such a determination, the controller may, for example, be configured to perform one or more control actions. In some embodiments, the control action may be associated with restoring the performance of the rotating ground engaging tool(s), such as adjusting one or more operating parameters of the implement, (e.g., by adjusting the position of an associated gauge wheel to increase the penetration depth of the rotating ground engaging tool(s)). In other embodiments, the control action may include providing a message or notification to another controller or the operator of the implement regarding the status of the wear on the rotating ground engaging tool(s).

Referring now to the drawings, FIG. 1 illustrates a perspective view of one embodiment of an agricultural implement 10 in accordance with aspects of the present subject matter. It should be appreciated that, although the implement 10 illustrated herein corresponds to a planter, the implement 10 may generally correspond to any suitable equipment or implement, such as a seeder (e.g., a seed disc drill) or another seed dispensing implement, a side dresser or another fertilizer dispensing implement, a strip tiller, a tillage implement (e.g., a disc harrow), and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 2:
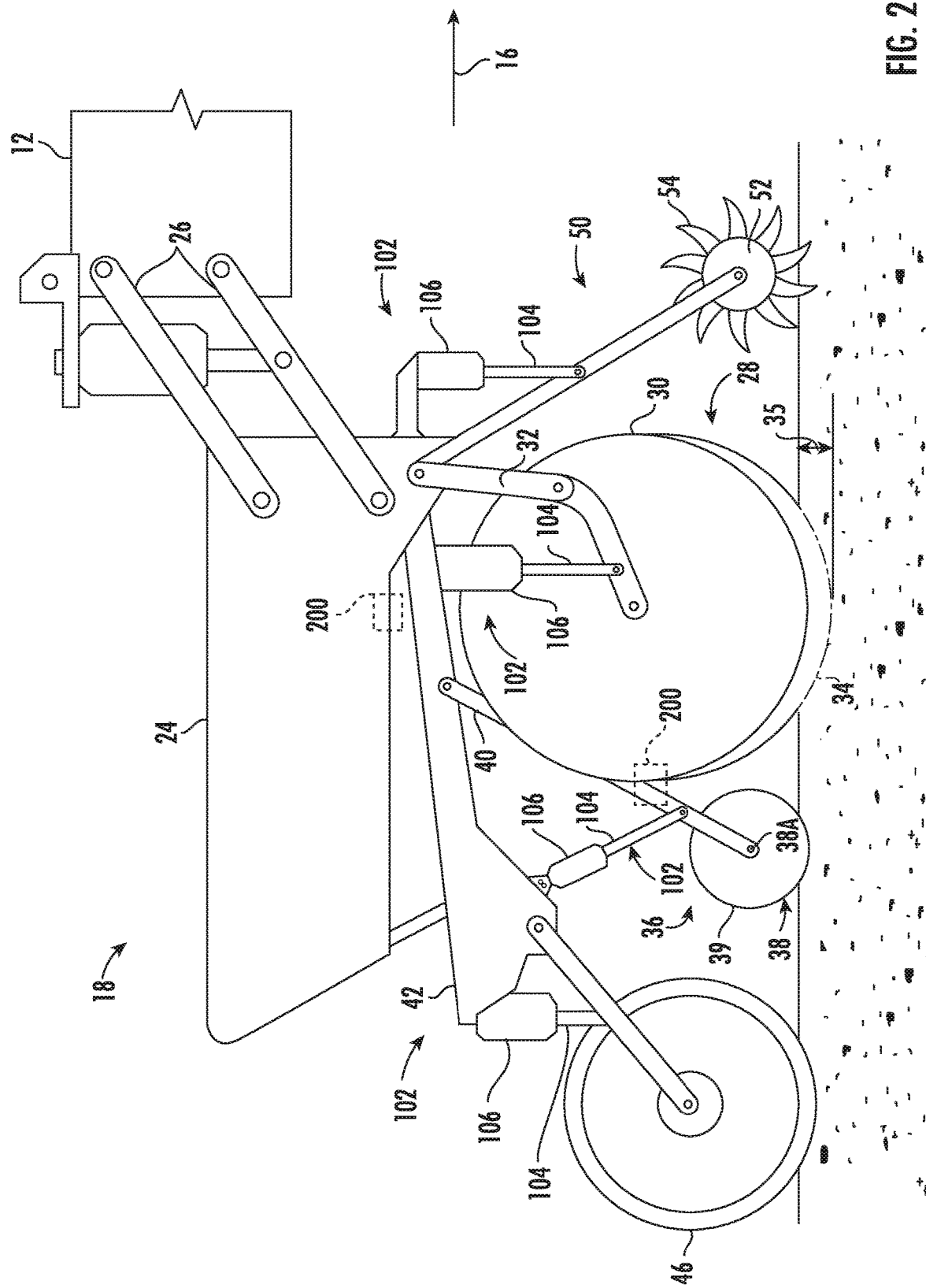
FIG. 2 illustrates a side view of one embodiment of a row unit suitable for use with an agricultural implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner. For example, the links 26 may be fixedly coupled to the frame 24 and/or the links 26 may be non-parallel. Additionally, in a further embodiment, the implement 10 may not include the links 26. In such instance, the implement 10 may include other components for coupling each row unit 18 to the toolbar 12.

As shown in FIG. 2, the row unit 18 also includes a furrow opening assembly 28. For example, in one embodiment, the furrow opening assembly 28 may include a gauge wheel 30 and one or more disc openers 34 configured to excavate a furrow or trench in the soil. As is generally understood, the gauge wheel 30 may be configured to engage the top surface of the soil as the implement 10 is moved across the field. In this regard, the height of the disc opener(s) 34 may be adjusted with respect to the position of the gauge wheel 30 to set the desired depth 35 of the furrow being excavated. Furthermore, the furrow opening assembly 28 may include a support arm 32 configured to adjustably couple the gauge wheel 30 and the disc opener(s) 34 to the frame assembly 24. For example, one end of the support arm 32 may be pivotably coupled to the gauge wheel 30 and the disc opener(s) 34, while an opposed end of the support arm 32 may be pivotably coupled to the frame 24. However, it should be appreciated that, in alternative embodiments, the gauge wheel 30 and the disc opener(s) 34 may be coupled to the frame 24 in any other suitable manner.

Figure 3:
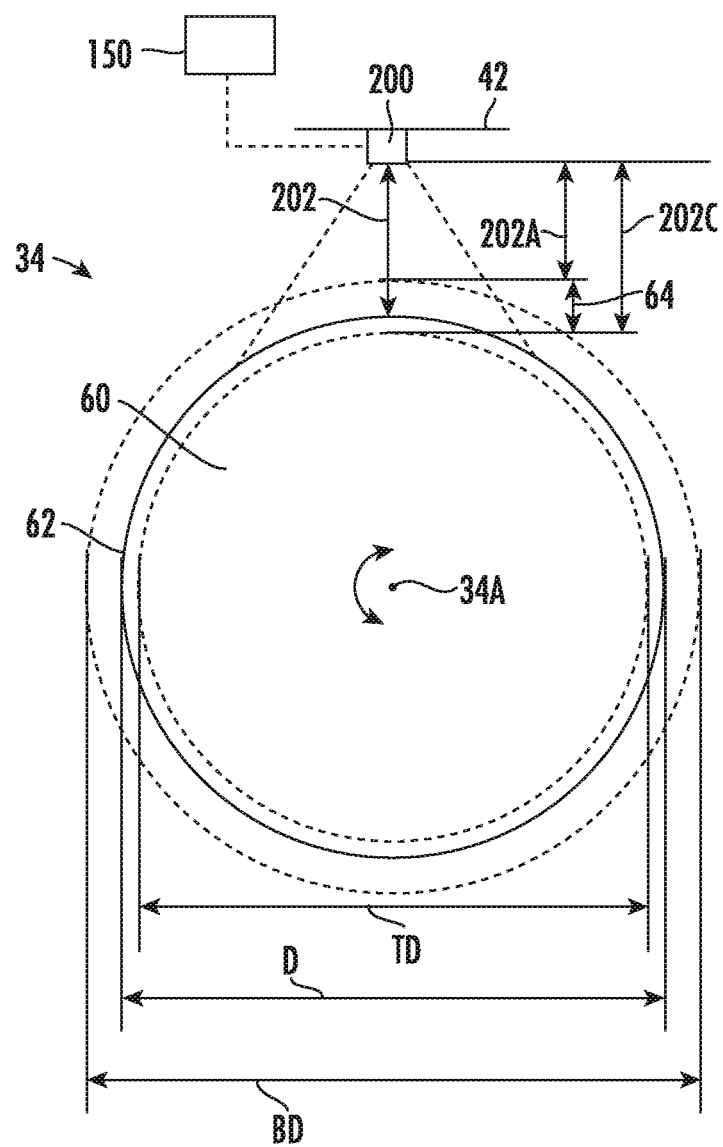
FIG. 3 illustrates a partial, perspective view of the row unit shown in FIG. 2 in accordance with aspects of the present subject matter, particularly illustrating a ground engaging tool of the row unit.

In one embodiment, as is particularly shown in FIG. 3, a body 60 of the disc opener 34 is rotatable about a rotational axis 34A and defines an outer surface or circumference 62 corresponding to a current outer diameter D. In an unworn condition, the outer surface or circumference 62 defines a baseline outer diameter BD, As the disc opener 34 is rotated about its rotational axis 34A to excavate a furrow or trench in the soil, the outer surface 62 of the disc opener 34 wears down and the outer diameter D becomes smaller. In several embodiments, the disc opener 34 is configured to be replaced once the disc opener 34 has undergone a certain amount of wear. As will be described below, an allowable wear distance 64 is defined relative to the unworn outer surface 62 and corresponds to a wear threshold diameter TD. Thus, as the outer surface 62 wears down over time, the distance between the outer diameter D and the wear threshold diameter TD may be reduced. When the outer diameter D reaches or becomes smaller than the wear threshold diameter TD, the disc opener 34 should be replaced. Several systems and methods will be described below in detail for automatically determining the wear status of the disc opener 34. However, the systems and method disclosed herein may also be applied to determine the wear status of any other suitable rotating ground engaging tools of an implement.

Referring back to FIG. 2, the row unit 18 may include a furrow closing assembly 36. Specifically, in several embodiments, the furrow closing assembly 36 may include a pair of closing discs 38 (only one of which is shown) positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38. Additionally, the row unit 18 may include a press wheel 46 configured to roll over the closed furrow to firm the soil over the seed and promote favorable seed-to-soil contact.

Furthermore, in one embodiment, a residue removal device 50 may be positioned at the forward end of the row unit 18 relative to the direction of travel 16. In this regard, the residue removal device 50 may be configured to break up and/or sweep away residue, dirt clods, and/or the like from the path of the row unit 18 before the furrow is formed in the soil. For example, in one embodiment, the residue removal device 50 may include one or more residue removal wheels 52, with each wheel 52 having a plurality of tillage points or fingers 54. As such, the wheel(s) 52 may be configured to roll relative to the soil as the implement 10 is moved across the field such that the fingers 54 break up and/or sweep away residue and dirt clods. Furthermore, although only one residue removal wheel 52 is shown in FIG. 2, it should be appreciated that, in alternative embodiments, the residue removal device 50 may include any other suitable number of residue removal wheels 52. For example, in one embodiment, the residue removal device 50 may include a pair of residue removal wheels 52.

In several embodiments, the row unit 18 may include one or more actuators 102. Specifically, each actuator 102 may be configured to adjust to the position of a rotating ground engaging tool of the row unit 18 relative to the frame 24. For example, in one embodiment, a first end of each actuator 102 (e.g., a rod 104 of each actuator 102) may be coupled to an arm on which the rotating ground engaging tool is mounted, while a second end of each actuator 102 (e.g., the cylinder 106 of each actuator 102) may be coupled to the chassis arm 42 or a bracket 58, which is, in turn, coupled to the frame 24. The rod 104 of each actuator 102 may be configured to extend and/or retract relative to the corresponding cylinder 106 to adjust the positioning of and/or the downforce applied to the associated rotating ground engaging tool. In one embodiment, the actuator(s) 102 may correspond to a fluid-driven actuator(s), such as a hydraulic or pneumatic cylinder(s). However, it should be appreciated that the actuator(s) 102 may correspond to any other suitable type of actuator(s), such as an electric linear actuator(s). As used herein, a rotating ground engaging tool may be any tool of the implement 10 configured to rotate relative to the soil as the implement 10 is moved across a field.

As shown in FIG. 2, the actuator(s) 102 may be configured to adjust the positioning of and/or the downforce applied to any number of rotating ground engaging tools of the row unit 18. Specifically, in several embodiments, the actuator(s) 102 may configured to adjust the positioning of and/or the downforce applied to one or more rotating ground engaging tools of the furrow opening assembly 28, the furrow closing assembly 36, and/or the residue removal device 50. For instance, as shown in the illustrated embodiment, an actuator 102 associated with the gauge wheel 30 may configured to adjust the relative positioning of the gauge wheel 30, thereby adjusting the penetration depth 35 of the disc opener(s) 34. For example, the actuator 102 associated with the gauge wheel 30 may be retracted to raise the gauge wheel 30 relative to the disc opener(s) 34 and thereby increase the depth of the furrow created by the disc opener(s) 34. Similarly, the actuator 102 associated with the gauge wheel 30 may be extended to lower the gauge wheel 30 relative to the disc opener(s) 34 and thereby decrease the depth of the furrow created by the disc opener(s) 34. Additionally, as shown in FIG. 2, an actuator(s) 102 may be provided in operative association with any other suitable rotating ground engaging tools of the row unit 18, such as the closing disc(s) 38, the press wheel(s) 46, and/or the residue removal wheel(s) 52.

Figure 4:
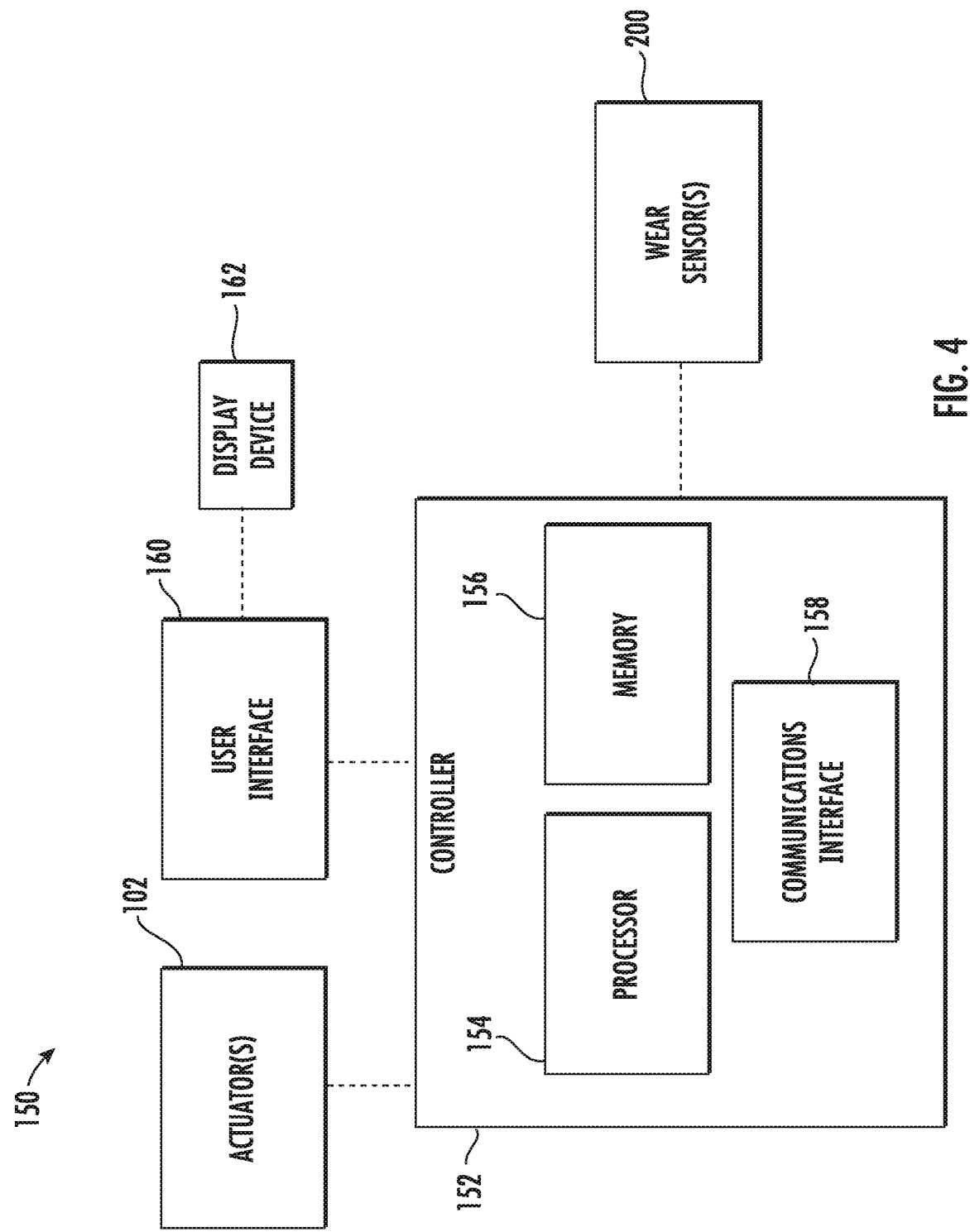
FIG. 4 illustrates a schematic view of one embodiment of a system for monitoring the wear on ground engaging tools of an agricultural implement in accordance with aspects of the present subject matter.

Referring now to FIG. 4, a schematic view of one embodiment of a system 150 for monitoring the status of the ground engaging tools of an agricultural implement (e.g., the amount of wear on the ground engaging tools) is illustrated in accordance with aspects of the present subject matter. In general, the system 150 will be described herein with reference to the agricultural implement 10 described above with reference to FIG. 1 and the row unit 18 and disc opener(s) described above with reference to FIGS. 2 and 3, respectively. However, it should be appreciated by those of ordinary skill in the art that the disclosed system 150 may generally be used with agricultural implements 10 having any other suitable implement configuration and/or ground engaging assemblies having any other suitable rotating ground engaging tool(s), e.g., the furrow closing assembly 36 and its associated closing disc(s) 38.

As shown in FIG. 4, the system 150 may include a controller 152 configured to electronically control the operation of one or more components of the agricultural implement 10. In general, the controller 152 may comprise any suitable processor-based device known in the art, such as a computing device or any suitable combination of computing devices. Thus, in several embodiments, the controller 152 may include one or more processor(s) 154, and associated memory device(s) 156 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 156 of the controller 152 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the processor(s) 154, configure the controller 152 to perform various computer-implemented functions, such as one or more aspects of the methods and algorithms that will be described herein. In addition, the controller 152 may also include various other suitable components, such as a communications circuit or module, one or more input/output channels, a data/control bus and/or the like.

It should be appreciated that, in several embodiments, the controller 152 may correspond to an existing controller of the agricultural implement 10 and/or of the work vehicle to which the implement 10 is coupled. However, it should be appreciated that, in other embodiments, the controller 152 may instead correspond to a separate processing device. For instance, in one embodiment, the controller 152 may form all or part of a separate plug-in module that may be installed within the agricultural implement 10 and/or the associated work vehicle to allow for the disclosed system and method to be implemented without requiring additional software to be uploaded onto existing control devices of the implement/vehicle.

In some embodiments, the controller 152 may include a communications module or interface 158 to allow for the controller 152 to communicate with any of the various other system components described herein. For instance, in several embodiments, the controller 152 may be configured to receive data from one or more sensors of the agricultural implement 10 that are used to monitor the status of the disc opener(s) 34, such as one or more wear-detecting sensors (e.g., one or more non-contact wear sensor(s) 200). The controller 152 may be communicatively coupled to the wear sensor(s) 200 via any suitable connection, such as a wired or wireless connection, to allow data indicative of the condition of the disc opener(s) 34 to be transmitted from the wear sensor(s) 200 to the controller 152.

As will be described below, the controller 152 may be configured to determine the status of the wear on each of the disc openers 34 based on the data received from the one or more wear sensor(s) 200. For example, the controller 152 may include one or more suitable algorithms stored within its memory 156 that, when executed by the processor 154, allow the controller 152 to determine the status of the wear on the disc openers 34 based on the data from the sensor(s) 200. The controller 152 may be configured to monitor the status of the wear on the disc opener(s) 34 periodically, continuously, or only as demanded by an operator of the implement 10. For example, in some embodiments, the controller 152 may collect data from the sensor(s) 200 periodically based on some predetermined delay period or sampling frequency, such as after a predetermined period of time (e.g., a set amount of operating time), after a certain operating distance covered (e.g., a set amount of acres worked by the implement 10), and/or the like.

Further, in some embodiments, the controller 152 may be configured to indicate to an operator the status of the wear on each of the disc opener(s) 34. For example, in the embodiment shown in FIG. 4, the communications module may allow the controller 152 to communicate with a user interface 160 having a display device 162, with the display device 162 being configured to display wear information regarding one or more of the disc opener(s) 34. However, it should be appreciated that the controller 152 may instead be coupled to any number of other indicators, such as lights, alarms and/or the like to provide an indicator to the operator regarding the condition of the disc opener(s) 34.

Additionally, the controller 152 may be configured to perform one or more implement-related control actions based on the determination of the status of the wear on the disc opener(s) 34. Specifically, in some embodiments, the controller 152 may be configured to control one or more components of the agricultural implement 10 based on the determination of the wear on the disc opener(s) 34. For example, as shown in FIG. 4, the controller 152 may be configured to control one or more of the actuators 102 to adjust the operation of the disc opener(s) 34. For instance, the controller 152 may be configured to control the actuator(s) 102 associated with the gauge wheel 30 to adjust the penetration depth 35 of the associated disc opener(s) 34 when it is determined that one or more of the disc opener(s) 34 is worn significantly enough that an adjustment is necessitated or desired. More specifically, the controller 152 may be configured to control the actuators 102 associated with the gauge wheels 30 to raise the gauge wheels 30 to increase the penetration depth 35 of the associated disc openers 34 when the disc openers 34 have experienced a given amount of wear.

As indicated above, in several embodiments, the system 150 may include one or more sensors 200 in communication with the controller 152 that are configured to capture data indicative of the wear on the disc opener(s) 34. For example, as shown in FIG. 2, each furrow opening assembly 28 may include or be associated with a non-contact wear sensor 200 installed or otherwise positioned remotely from a respective one of the disc openers 34. For example, as shown in the illustrated embodiment, the wear sensor 200 is fixed to the frame 24 of the row unit 18. However, it should be appreciated that the wear sensor 200 may be configured to be installed at any suitable location on the row unit 18 that allows the sensor 200 to capture data indicative of the amount of wear occurring on the adjacent disc opener 34. In such embodiment, the wear sensor 200 may be configured to capture data indicative of a wear status of the disc opener 34, such as the wear occurring along the outer surface or circumference 62 of the disc opener 34. For instance, the wear sensor 200 may be fixed relative to the axis of rotation 34A of the disc opener 34 and may be configured to have a sensor detection range or field of view that includes at least a portion of the outer surface 62 of the disc opener 34 (e.g., a portion of the outer diameter D closest to the frame 24).

In the embodiments described below, the data captured by the wear sensor 200 may be indicative of the reduction in outer diameter D of the body 60 of the disc opener 34 as the outer surface 62 wears down over time, such as by capturing data associated with a distance between the wear sensor 200 and the outer surface 62 of the disc opener 34 (e.g., as indicated by distance 202 in FIG. 3). In such embodiments, it should be appreciated that the wear sensor 200 may generally correspond to any suitable non-contact-based sensor or sensing device configured to capture or provide data indicative of such reduction in thickness. For instance, in several embodiments, the wear sensor 200 may be configured to capture vision-based data associated with the outer surface 62 of the disc opener 34 or emit one or more output signals for reflection off of the outer surface 62 of the disc opener 34 (and subsequently receive or sense the return signal(s)). In one embodiment, the wear sensor 200 may correspond to a vision-based sensor, such as a LIDAR device, a camera e.g., a stereo camera), and/or the like, that is configured to capture vision-based data associated with the amount of wear occurring on the disc opener 34 (e.g., by detecting the current distance 204 defined between the wear sensor 200 and the outer surface 62 of the disc opener 34). In another embodiment, the wear sensor 200 may correspond to a radio detection and ranging (RADAR) sensor configured to transmit radio waves towards the outer surface 62 of the disc opener 34 and receive the return waves reflected off of the outer surface 62 of the disc opener 34. In a further embodiment, the wear sensor 200 may correspond to an ultrasonic sensor configured to transmit sound waves from the location of the sensor and detect the reflection of such sound waves off of the outer surface 62 of the disc opener 34, thereby providing an indication of the current distance 204 defined between the wear sensor 200 and the outer surface 62 of the disc opener 34.

In the embodiment illustrated in FIG. 3, a baseline distance 202A may be detected between the wear sensor 200 and the outer surface 62 of the disc opener 34 in an unworn condition, corresponding to the baseline outer diameter BD. This baseline distance 202A may, in one embodiment, be initially detected when the disc opener 34 is first installed on the row unit 18 and stored within the controller's memory 156 based on data received from the wear sensor 200. Alternatively, the baseline distance 202A may be predetermined and/or pre-set within the memory 156 of the controller 150. It should be appreciated that, in one embodiment, the baseline distance 202A generally corresponds to the minimum distance between the outer surface 62 or diameter D of the disc opener 34 and the wear sensor 200 (assuming the disc opener 34 remains clean and does not accumulate soil or other material on its outer surface 62). Thus, as the disc opener 34 wears, the current distance 202 between the wear sensor 200 and the outer surface 62 or diameter D should increase from the baseline distance 202A. Once the disc opener 34 has worn down the allowable wear distance 64 from the baseline distance 202A along the radial direction of the disc opener 34 to the given wear threshold diameter TD, the wear sensor 200 may detect that the current distance 202 to the outer surface 62 of the disc opener 34 is equal to or exceeds a corresponding threshold distance 202C indicating that the disc opener 34 needs to be replaced. In such an embodiment, the threshold distance 202C may be predetermined and/or pre-set within the memory 156 of the controller 150 according to the specifications of the disc opener 34.

In several embodiments, the controller 152 may be configured to determine the status of the wear on the disc opener 34 by comparing the current distance 202 measured by the wear sensor 200 to a given wear threshold distance. Specifically, in one embodiment, the controller 152 may be configured to compare the current distance 202 to the predetermined threshold distance 202C. For example, if the currently monitored distance 202 is greater than or equal to the threshold distance 202C, the controller 152 may determine that the disc opener 34 was worn to or past the associated wear threshold diameter TD, thereby indicating that the disc opener 34 needs to be replaced. Conversely, if the monitored distance 202 is less than the threshold distance 202C, the controller 152 may determine that the disc opener 34 still has remaining wear life and, thus, that there is no current need to replace the disc opener 34. In such an embodiment, the controller 152 may also be configured to determine or estimate the remaining component life or allowable wear remaining based on a comparison between the current distance 202 and the threshold distance 202C. For example, the controller 152 may subtract the current distance 202 from the threshold distance 202C to determine the remaining wear distance or diameter of the disc opener 34 and/or otherwise update the wear status of the disc opener 34. The controller 152 may further be configured to indicate to the operator the status of the wear on the disc opener 34 and/or perform one or more control actions based on the determined wear status of the disc opener 34.

In another embodiment, as opposed to using the threshold distance 202C as a wear threshold distance, the controller 152 may be configured to determine the status of the wear on the disc opener 34 by comparing the current distance 202 measured by the wear sensor 200 to the predetermined baseline distance 202A. For example, if the currently monitored distance 202 is greater than the baseline distance 202A, then the controller 152 may calculate a differential between the baseline distance 202A and the current distance 200 to determine the wear distance of the disc opener 34 and its corresponding wear status. For example, in one embodiment, the wear distance determined based on the differential between the baseline distance 202A and the current distance 200 may be compared to the allowable wear distance 64 (e.g., corresponding to the total wear distance that the disc opener 34 may encounter before reaching the wear threshold diameter TD) to determine the wear status on the disc opener 34. In the embodiment shown in FIG. 3, the allowable wear distance 64 may correspond to the differential between the threshold distance 202C and the baseline distance 202A.

As indicated above, based on the data received from the sensor 200, the controller 152 may be configured to monitor the status of the wear occurring on the associated disc opener 34. In this regard, by installing multiple sensors 200 on the implement (e.g., at least one on each row unit 18), the controller 152 may be configured to monitor the wear status of all or a portion of the disc openers 34 installed on the implement 10. Regardless, by receiving the wear-related data associated with one or more of the disc openers 34, the controller 152 may be further configured to indicate to the operator the status of the wear of such monitored disc opener(s) 34 and/or perform one or more control actions based on the determined wear status of the monitored disc opener(s) 34 as discussed above with reference to FIG. 4.

Further, in embodiments where each row unit 18 has more than one disc opener 34, the controller 152 may be configured to extrapolate the status of the wear on one or more of the disc openers 34 of the row unit 18 based on the status of the wear on one other disc opener 34 of the row unit 18. For example, the controller 152 may be configured to determine the status of the wear on only a first one of the disc openers 34 of the row unit based on the sensor data received from the sensor 200 associated with such disc opener 34. The controller 152 may then set the status of the wear on one or more of the other disc openers 34 of the row unit 18 as being equal to the determined wear on the monitored disc opener 34, without receiving additional input from the sensors 200 of the implement 10, In such embodiment, fewer sensors 200 may be required, thus reducing complexity and associated costs of the system 150. Alternatively, it should be appreciated that each disc opener 34 may be associated with a dedicated wear sensor 200 for determining a status of the wear on the disc opener 34.

Additionally or alternatively, as indicated above, in several embodiments, one or more wear sensors may be used to monitor the status of the closing disc(s) 38. Specifically, as shown in FIG. 2, each furrow closing assembly 46 may include or be associated with one or more of the wear sensors 200 installed or otherwise positioned remotely from a respective one of the closing discs 38 to capture data indicative of the amount of wear occurring on the closing disc 38 associated with the sensor 200. Particularly, the wear sensor 200 may be configured to capture data indicative of the wear occurring along an outer surface or circumference 39 of the closing disc 38. For instance, the wear sensor 200 may be fixed relative to an axis of rotation 38A of the closing disc 38 and may be configured to have a sensor detection range or field of view that includes at least a portion of the outer surface 39 of the closing disc 38. In such instance, the controller 152 may be configured to determine the status of the wear on each of the closing discs 38 based on the data received from the one or more wear sensor(s) 200. For example, the controller 152 may include one or more suitable algorithms stored within its memory 156 that, when executed by the processor 154, allow the controller 152 to determine the status of the wear on the closing discs 38 based on the data from the one or more sensor(s) 200. The controller 152 may be further configured to indicate to the operator the status of the wear of such monitored closing disc(s) 38 and/or perform one or more control actions based on the determined wear status of the monitored closing disc(s) 38, such as by controlling the respective actuator(s) 102 to adjust the relative positioning of the closing disc(s) 38.

In embodiments where each row unit 18 has more than one closing disc 38, the controller 152 may be configured to extrapolate the status of the wear on one or more of the closing discs 38 of a row unit 18 based on the status of the wear on one or more other closing discs 38 of the row unit. Alternatively, it should be appreciated that each closing disc 38 may be associated with a dedicated wear sensor 200 for determining a status of the wear on the disc opener 38.

Referring now to FIG. 5, a flow diagram of one embodiment of a method 250 for monitoring the wear on a ground engaging tool of an agricultural implement is illustrated in accordance with aspects of the present subject matter. In general, the method 250 will be described herein with reference to the implement 10, row unit 18, and disc opener(s) 34 shown in FIGS. 1-3, as well as the system 150 shown in FIG. 4. However, it should be appreciated that the disclosed method 250 may be executed with implements and/or assemblies having any other suitable configurations and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 5, at (252), the method 250 may include receiving, with a computing device, an input indicative of the wear on the ground engaging tool from a non-contact sensor supported relative to the frame. For example, as indicated above, the controller 152 may be communicatively coupled to one or more wear sensors 200, with each sensor 200 being configured to provide sensor data indicative of the amount of wear occurring on a ground engaging tool, such as one of the disc openers 34 of the implement 10. In one embodiment, as described above, the sensor data may be indicative of a distance defined between the sensor 200 and the outer surface 62 defining an outer diameter D of the associated disc opener 34.

Additionally, at (254), the method 250 may include comparing, with the computing device, the input with a predetermined wear threshold for the ground engaging tool. For example, as indicated above, the controller 152 may compare the wear-related sensor data to one or more predetermined wear thresholds defined for the ground engaging tool. For instance, when the sensor data is indicative of a distance 202 defined between the wear sensor 200 and the outer surface 62 of the disc opener 34, the controller 152 may be configured to compare the monitored distance 202 to a corresponding predetermined threshold distance, such as the baseline distance 202A and/or the threshold distance 202C described above with reference to FIG. 3.

Moreover, at (256), the method 250 may include determining, with the computing device, a status of the wear on the ground engaging tool based on the comparison of the input with the predetermined wear threshold. For example, as discussed above, the controller 152 may determine that the wear on the disc opener 34 is unacceptable and that the disc opener 34 needs to be replaced if the currently monitored distance 202 is greater than or equal to the threshold distance 202C, and/or if the amount of wear from the baseline distance 202A is greater than an allowable wear distance 64. Alternatively, the controller may 152 may determine that the disc opener 34 has worn a sufficient amount to justify the execution of an associated control action, such as an adjustment of the gauge wheel position to increase the penetration depth of the opener 34 to account for the amount of wear that has been detected.

It is to be understood that, in several embodiments, the steps of the method 250 are performed by the controller 152 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 152 described herein, such as the method 250 is implemented in software code or instructions which are tangibly stored on a tangible computer readable medium. The controller 152 loads the software code or instructions via a direct interface with the computer readable medium or via a wired and/or wireless network. Upon loading and executing such software code or instructions by the controller 152, the controller 152 may perform any of the functionality of the controller 152 described herein, including any steps of the method 250 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural implement, comprising:
   a toolbar;
   a plurality of row units configured to be supported by the toolbar, each row unit of the plurality of row units comprising:
      a frame;
      a disc opener rotatably supported relative to the frame;
      a sensor supported relative to the disc opener, the sensor configured to detect a parameter indicative of wear on the disc opener; and
      a gauge wheel rotatably coupled to the frame and actuatable to adjust a penetration depth of the disc opener; and
   a controller communicatively coupled to the sensor of one or more of the plurality of row units, the controller configured to determine a status of the wear on the disc opener of the one or more of the plurality of row units based on sensor data received from the sensor.

2. The agricultural implement of claim 1, wherein each sensor comprises a vision based sensor.

3. The agricultural implement of claim 1, wherein, for each row unit of the plurality of row units, the sensor is configured to detect a distance between the sensor and an outer surface of the disc opener, with changes in the distance being indicative of the wear on the disc opener.

4. The agricultural implement of claim 3, wherein the outer surface defines an outer diameter of the disc opener, the changes in the distance being indicative of changes in the outer diameter of the disc opener.

5. The agricultural implement of claim 1, wherein each row unit of the plurality of row units further comprises an actuator, the controller being further configured to control an operation of the actuator of the one or more of the plurality of row units to actuate the gauge wheel of the one or more of the plurality of row units based at least in part on the status of the wear on the disc opener of the one or more of the plurality of row units.

6. The agricultural implement of claim 1, wherein, for each row unit of the plurality of row units, the disc opener is rotatable about a rotational axis, with a distance between the sensor and the rotational axis being fixed.

7. The agricultural implement of claim 1, wherein the disc opener of each row unit of the plurality of row units is a first disc opener, each row unit of the plurality of row units further comprising a second disc opener, the controller being configured to determine, for each row unit of the plurality of row units, a status of the wear on the second disc opener based on the status of the wear on the first disc opener.

8. A wear monitoring system for ground engaging tools of an agricultural implement, the wear monitoring system comprising:
   a ground engaging tool supported relative to a frame of the agricultural implement, the ground engaging tool configured to rotate with engagement of ground during operation of the agricultural implement;
   a non-contact sensor configured to detect a parameter indicative of wear on the ground engaging tool; and
   a controller communicatively coupled to the non-contact sensor, the controller configured to determine a status of the wear on the ground engaging tool based on sensor data received from the non-contact sensor.

9. The wear monitoring system of claim 8, wherein the non-contact sensor comprises a vision based sensor.

10. The wear monitoring system of claim 8, wherein the non-contact sensor is configured to detect a distance between the non-contact sensor and an outer surface of the ground engaging tool, with changes in the distance being indicative of the wear on the ground engaging tool.

11. The wear monitoring system of claim 10, wherein the outer surface defines an outer diameter of the ground engaging tool, the changes in the distance being indicative of changes in the outer diameter of the ground engaging tool.

12. The wear monitoring system of claim 8, wherein the ground engaging tool is rotatable about a rotational axis, with a distance between the non-contact sensor and the rotational axis being fixed.

13. The wear monitoring system of claim 8, further comprising a user interface in communication with the controller, the controller being configured to indicate the status of the wear on the ground engaging tool to an operator of the agricultural implement via the user interface.

14. The wear monitoring system of claim 8, wherein the controller is configured to adjust an operation of the agricultural implement based at least in part on the status of the wear on the ground engaging tool.

15. The wear monitoring system of claim 14, wherein the ground engaging tool comprises a disc opener,
   the wear monitoring system further comprising a gauge wheel and an actuator, the controller being configured to control an operation of the actuator to actuate the gauge wheel based at least in part on the status of the wear on the disc opener.

16. A method for monitoring wear on a ground engaging tool of an agricultural implement, the agricultural implement including a frame and a ground engaging tool supported relative to the frame such that the ground engaging tool rotates with engagement of ground during operation of the agricultural implement, the method comprising:
   receiving, with a computing device, an input indicative of the wear on the ground engaging tool from a non-contact sensor supported relative to the frame;
   comparing, with the computing device, the input with a predetermined wear threshold for the ground engaging tool;
   determining, with the computing device, a status of the wear on the ground engaging tool based on the comparison of the input with the predetermined wear threshold; and
   controlling, with the computing device, an operation of a device associated with the agricultural implement based at least in part on the status of the wear on the ground engaging tool.

17. The method of claim 16, wherein controlling the operation of the device associated with the agricultural implement comprises controlling an operation of an actuator of the agricultural implement to actuate a gauge wheel to adjust a penetration depth of the ground engaging tool.

18. The method of claim 16, wherein controlling the operation of the device associated with the agricultural implement comprises controlling a user interface associated with the agricultural implement to indicate the status of the wear on the ground engaging tool to an operator of the agricultural implement.

19. The method of claim 16, wherein the input indicative of the wear on the ground engaging tool is received during a planting operation of the agricultural implement, and wherein the ground engaging tool is a disc opener.

\* \* \* \* \*